INVENTORS F. B. HAGEDORN
A. J. KURTZIG
BY George S. Indig
ATTORNEY 3,741,802

METHOD OF PRODUCING MAGNETIC DEVICES UTILIZING GARNET EPITAXIAL MATERIALS

Fred Bassett Hagedorn, Berkeley Heights, and Arjeh Jehuda Kurtzig, Short Hills, N.J., assignors to Bell Telephone Laboratories, Incorporated, Murray Hill and Berkeley Heights, N.J.

Filed Apr. 12, 1971, Ser. No. 133,187
Int. Cl. H01f 10/02
U.S. Cl. 117—237 9 Claims

ABSTRACT OF THE DISCLOSURE

Device properties of heteroepitaxial garnet films evidencing growth-induced magnetic anisotropy intended for use in magnetic devices performing the functions of storage, switching, light deflection, etc., are improved by annealing for critical periods over the temperature range of from about 1200° C. to 1350° C.

BACKGROUND OF THE INVENTION

(1) Field of the invention

The invention is concerned with heteroepitaxial devices in which both the epitaxial layer and the substrate are of the garnet structure. Devices of concern are useful by reason of properties related to a growth-induced easy direction of magnetization generally normal to the plane of the film. Such devices may perform any of a number of functions including those of memory or switching. A preferred category known as "bubble" devices depend upon the propagation and movement of small cylindrical magnetic domains.

(2) Description of the prior art

Considerable interest has been generated over the past year with the announcement that controlled, growth-induced noncubic magnetic anisotropy can be produced in magnetic materials of the garnet structure in which dodecahedral sites are occupied by two or more different cations (see A. H. Bobeck, E. G. Spencer, L. G. Van Uitert, S. C. Abrahams, R. L. Barns, W. H. Grodkiewicz, R. C. Sherwood, P. H. Schmidt, D. H. Smith and E. M. Walters, Applied Physics Letters 17, pp. 131–134, Aug. 1, 1970). Among uses suggested for such materials are magnetic switching and storage devices which have come to be known as "bubble" domain devices. Such devices utilize thin sheets or films of magnetic material and must evidence sufficient noncubic magnetic anisotropy to permit the easy direction of magnetization to lie normal to the major plane (see IEEE Transactions on Magnetism, MAG.-5, pp. 544–553, 1969). Other devices in which such materials are suitably incorporated include light deflectors operating on interference effects (see T. R. Johansen, D. I. Norman and E. J. Torok, Abstract Journal, Conference on Magnetism and Magnetic Materials, paper GD-4, Nov. 16, 1970).

The origin of growth-induced anisotropy in garnet materials has been of considerable scientific interest. Prior to the announcement, it was thought that these fundamentally cubic materials could manifest noncubic anisotropy only due to strain. While various mechanisms have been postulated to explain the origin of the growth-induced effects, many believe that the responsible mechanism is pairing. It is certainly true that reported materials to date have all been characterized by a locally inhomogeneous population in dodecahedral sites. The original work was largely concerned with bulk grown crystals, and it was observed that the orientation of the easy direction of magnetization was related in some way to growth direction. For example, a [111] easy direction was found either essentially normal to or essentially parallel to a (211) free facet, depending on composition. Subsequent studies have revealed other easy directions generally under a (110) free facet of a bulk crystal.

Engineering interest was recently stimulated by the finding that growth-induced anisotropic effects similar to those resulting in bulk crystals could be produced in heteroepitaxially grown films (see, for example L. K. Shick, J. W. Nielson, A. H. Bobeck, A. J. Kurtzig, P. C. Michaelis, and J. P. Reekstin, Applied Physics Letters 18, pp. 89–91, Feb. 1, 1971). It is particularly interesting that such films may evidence major planes defining thermo-dynamically unstable facets. Such films are preferable to bulk grown crystals because thin dimensions are readily obtainable and also because a uniform easy direction of magnetization normal to the plane may be produced without the gradient in magnetic properties which generally characterizes bulk crystals.

Further development in films of the type described above have resulted in a high degree of perfection. Improvements due in part to substrate and in part to the growth film together have made it possible to produce material with fewer than 10 device-significant defects per square centimeter.

Despite the very significant improvements which have resulted, practical and other considerations continue to prompt further development. Areas in which further improvement may be made include regulation of anisotropy, regulation of domain size, and improvement in mobility.

SUMMARY OF THE INVENTION

In accordance with the invention, magnetic garnet films evidencing a growth-induced easy direction of magnetization essentially normal to the easy plane are annealed following a critical schedule at a temperature within the range of 1200° C. to 1350° C. It is found that such annealing, which is carried out in a nonreducing atmosphere such as oxygen, results in a significant improvement in mobility, a decrease in coercivity, and in the ability to tailor other magnetic properties such as anisotropy, domain size, etc. The procedures of the invention have been found to be applicable to epitaxial garnet films having growth-induced anisotropy which are otherwise suitable for device use.

DETAILED DESCRIPTION

(1) The figures

It has been indicated that the inventive procedures are applicable to films of the type described as utilized in a variety of devices. All such devices depend on a strong growth-induced crystalline anisotropy resulting in an easy direction normal to the plane of the film; most depend upon the creation and/or movement of magnetic domains of a magnetization direction opposite to that of the surrounding region. Domain patterns in many such devices are essentially cylindrical although some may assume striping configurations as, for example, in deflector use. The following description, considered exemplary, relates to "bubble" devices.

Figure 1:
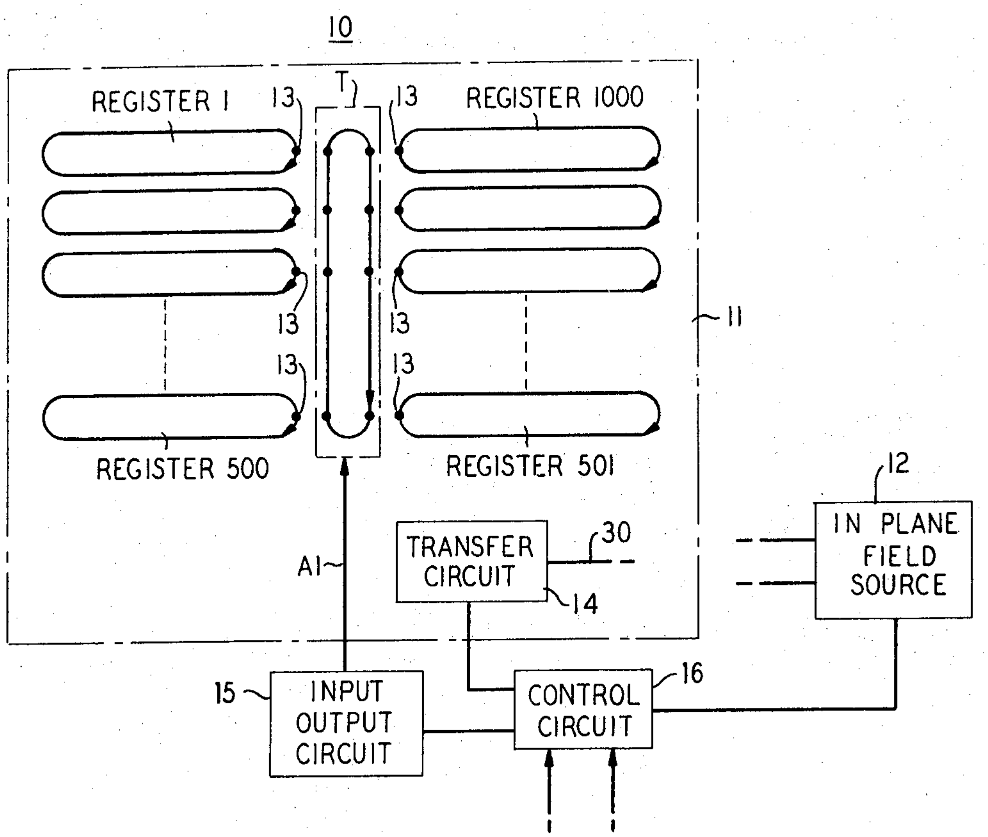
FIG. 1 is a schematic diagram of a recirculating memory utilizing an LPE grown garnet layer in accordance with the invention.
Figure 2:
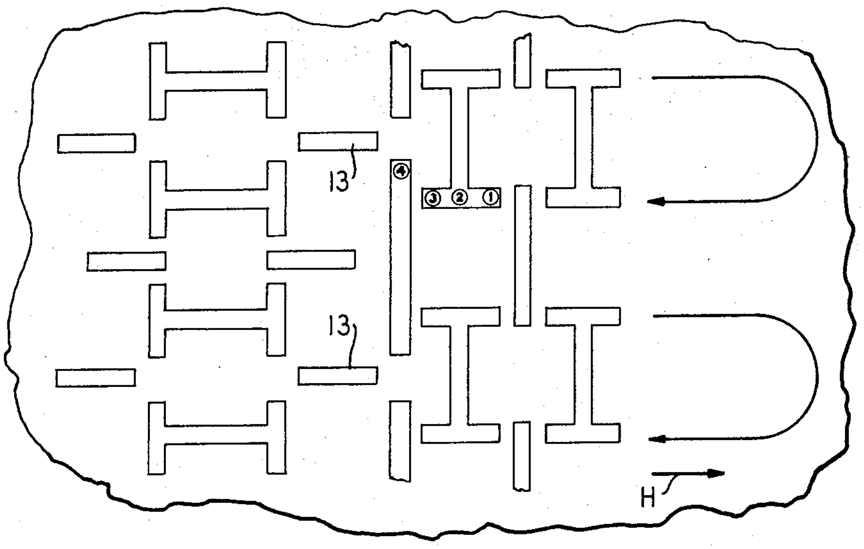
FIG. 2 is a detailed magnetic overlay and wiring configuration for portions of the memory of FIG. 1 showing domain locations during operation.

The device of FIGS. 1 and 2 is illustrative of the class of "bubble" devices described in IEEE Transactions on Magnetics, vol. MAG.-5 No. 3, September 1969, pp. 544–553 in which switching, memory and logic functions depend upon the nucleation and propagation of enclosed, generally cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains in accordance with this invention is dictated by patterns of magnetically soft overlay material in response to reorienting in-plane fields. For purposes of description, the overlays are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise. This operation is consistent with that disclosed in the aforementioned application of A. H. Bobeck and is explained in more detail hereinafter.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portion of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above mentioned application of Bobeck. Instead, the consecutive positions from the right as viewed in FIG. 2, for a domain adjacent the vertical channel preparatory to a transfer operation are described. A domain in position 4 of FIG. 2 is ready to begin its transfer cycle.

Device characteristics of concern affected by the procedures of the invention are related in known manner to the measured value of the magnetic anisotropy (the field required to rotate the direction of magnetization from the unique easy axis to the medium axis of magnetization perpendicular to the easy axis). The relationship of device parameters to this value is set forth in section 3 under the Detailed Description.

Figure 3:
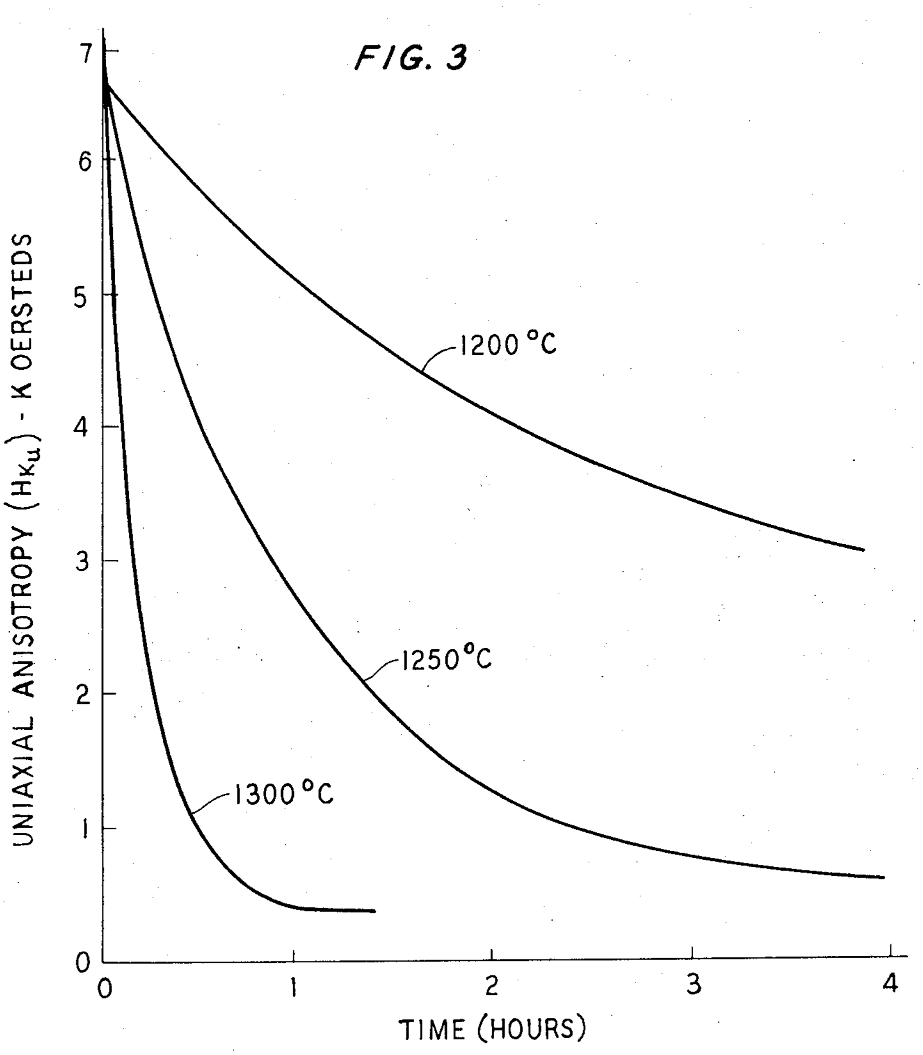
FIG. 3 with coordinates of uniaxial anisotropy field on the ordinate and annealing time in hours on the abscissa, relate these two parameters for a characteristic garnet film material as annealed at three different temperatures.

FIG. 3 relates the value of this parameter to time for three different anneal temperatures. For comparison purposes, the data for the three curves were all taken from experiments conducted in dry oxygen. Temperature in each of the three instances was maintained reasonably constant both spacially and in point of time (±15° C.) although from a commercial standpoint both may be varied sometimes intentionally (the former may result in tailored variations in bubble size or other parameters across the film).

(2) Processing

Consideration of desired device parameters such as magnitude of required field, domain configuration, mobility, etc., together indicate a desired ratio of $H_{K_u}$ (uniaxial anisotropy as defined above) to $4\pi M$ (where M is magnetization per unit volume) of between 2 to 5 (with $H_{K_u}$ in oersteds and $4\pi M$ in gauss). Materials of device interest are generally designed to have a saturation magnetization value of from about 100 gauss to about 300 gauss. Accordingly, desired values of $H_{K_u}$ lie between 200 oersteds and 1500 oersteds.

It is an unfortunate fact that garnet films otherwise of greatest device interest as grown may manifest $H_{K_u}/4\pi M$ ratios considerably in excess of the maximum indicated. For example, the particular composition, of which the data of FIG. 3 is plotted ($Eu_1Er_2Fe_{4.3}Ga_{0.7}O_{12}$), has an initial $H_{K_u}$ value of the order of 6500 oersteds while the magnetization, $4\pi M$, is of the order of 170 gauss so indicating a ratio of 38/1. Since the value of $4\pi M$ shows no appreciable change with annealing under the inventive conditions, the value of $H_{K_u}$ is desirably reduced to the range of from 340 to 850 oersteds. The plotted data of FIG. 3, found illustrative of otherwise suitable garnet film materials, indicates such reduction to be attainable after about ½ hour at 1300° and between 2 to 3 hours of 1250° C. While the plotted data is not carried for sufficient time at 1200, the experimental results produced a reduction to the value of $H_{K_u}$ of below 850 oersteds after a time of about 15 hours.

The form of the curves of FIG. 3 is generally valid for compositions of interest. There is a remarkable uniformity in reduction in $H_{K_u}$ so that a given time and temperature of anneal results in the same general fractional reduction in this parameter regardless of composition. The optimum value of $H_{K_u}$, at least for certain device uses, is optimized only in terms of the ratio of this parameter to $4\pi M$. Since the $4\pi M$ value for compositions of concern vary as indicated over the range of from 100 to 300 gauss, the desired anneal time must be varied accordingly.

Description in this section proceeds under the assumption that the unique anisotropy in the as-grown material is primarily growth induced. In general, film materials of concern have the unique anisotropy no more than about 10 percent of which is strain induced (since strain-induced anisotropy is due to a mismatch in lattice parameter and/or temperature coefficient, as between the film and substrate, long term anneal at elevated temperature, i.e., 5 hours at 1400° C. while removing all the growth-induced contribution, has a minimal effect on the strain contribution to the anisotropy of the cooled specimen).

The processing conditions are described:

(a) Temperature.—A temperature range of from 1200° C. to 1350° C. has been indicated, while temperatures below 1200 are effective, time required is generally too lengthy to be expedient. Temperatures above 1350° C. may be used; however, time intervals become so short as to become quite critical. A preferred temperature range of 1275 to 1325 is indicated on the same basis. Time intervals for the preferred temperature range are generally of the order of fractions of an hour.

(b) Time.—Time required to produce a fractional reduction in the value of $H_{K_u}$ may be expressed as a function of temperature. In general, reduction of $H_{K_u}$ to half its initial value requires about 4 hours at 1200° C. and about 5 minutes at 1350° C. The general relationship may be expressed:

$$\frac{\tau(T_1)}{\tau T_2}=\frac{E_{xp}(E_a/kT_1)}{E_{xp}E_a/kT_2} \quad (1)$$

where:

$\tau$ is the time required to reduce the anisotropy to a given fraction of its initial value, $T_1$ and $T_2$ are temperatures in degrees Kelvin, $E_a$ is the activation energy, and $k$ is Boltzman's constant.

The activation energy in the above equation has been experimentally determined to be equal to about 6 electron volts. Experimentation with a variety of compositions at a variety of temperatures and times have verified this value and have confirmed the equation.

It has been indicated that a desired terminal value for $H_{K_u}$ is from 2 to 5 times the value of $4\pi M$. This range is applicable to a group of devices including the bubble devices of FIGS. 1 and 2. For certain other devices, still lower ratio values may be desired. It is the general teaching herein that this ratio value can invariably be reduced by annealing (the ultimate value with respect to growth-induced contribution to $H_{K_u}$ is zero; and while this value is not to be attained, it may be closely approached for some contemplated uses).

For the inventive purposes, it is considered that a minimal reduction in $H_{K_u}$ of at least 10 percent is required. This limit, while not absolute, is chosen as reflecting a magnitude of change in related magnetic parameters which are of device significance. This relationship is discussed in some detail in section 3 under Detailed Description. It has been experimentally determined that a 10 percent change in $H_{K_u}$ requires approximately 30 minutes at 1200° C. with a 5 fold reduction in time for each increase of 50°, indicating a required minimal period of approximately 15 seconds at 1350° C. It has been experimentally determined that this consideration is relatively insensitive to compositional change. A preferred minimal reduction in the value of $H_{K_u}$ at least for "bubble" device use is of the order of 50 percent based on observed values of as-grown heteroepitaxial materials. Under ordinary circumstances such reduction requires of the order of 4 hours at 1200° C., again with a reduction of 5 fold in time for each 50° C. increase in temperature. Precise times required at any given temperature for attaining a particular reduction in $H_{K_u}$ may be readily ascertained from the data of FIG. 3.

The nature of the atmosphere used during processing is generally noncritical so long as it is substantially nonreducing with respect to the garnet material under processing. While inert atmospheres may be utilized, a general preference exists for oxidizing atmospheres. An oxidizing influence is insurance against reduction of iron, rare earth, and other cations which may be of consequence in more sophisticated device designs. For those purposes, it is prescribed that the atmosphere contain an amount of oxygen sufficient to equal the partial pressure of oxygen in the garnet layer (below $^1/_{10}$ atmosphere at 1200° C. and about ½ atmosphere at 1350° C.).

(3) Dependence of magnetic parameters on $H_{K_u}$

Thus far, the Detailed Description has been in terms of a reduction in $H_{K_u}$, it being generally indicated that such reduction results also in accompanying changes in magnetic parameters of device consequence. Such parameters are discussed (all following considerations are premised on an experimentally verified observation that any change in value of $4\pi M$ during annealing is of small magnitude):

(a) Mobility.—Domain wall mobility, regardless of domain configuration, varies as the square root of the reciprocal of $H_{K_u}$. While this has been experimentally observed, it may be explained in terms of wall thickness as follows. Mobility generally varies linearly with the domain wall thickness which, in turn, varies as the inverse of the square root of $H_{K_u}$. As seen from the examples, treatment of a variety of compositions, in accordance with the inventive procedure, has resulted in an improvement in mobility by a factor of 3.

(b) Domain size.—Reference is to enclosed domains, such as the generally cylindrical domains of concern in bubble devices of the nature of FIGS. 1 and 2. Annealing in accordance with the invention results in a reduction in stable domain size. The diameter of a stable domain varies approximately as the square root of $H_{K_u}$. An additional consideration common to the design of all devices has to do with the relationship between film thickness and domain size. For bubble devices, it is generally desired that film thickness be of the order of a stable domain diameter (generally of the order of from 2 to 20 micrometers). It follows that consideration of this relationship leads to film growth of a thickness less than that of the domain diameter before treatment. The relationship between optimum domain diameter and domain wall energy follows:

$$d=\frac{2\sigma_w}{\pi M_s^2} \qquad (2)$$

where:

$d$ equals optimum bubble diameter (approximately centered in the range of stable domain size),
$M_s$ is the saturation magnetization in gausses, and
$\sigma_w$ is the domain wall energy density.

$\sigma_w$ is proportional to $\sqrt{AK}$ $$\sigma_w=\sqrt{AK} \qquad (3)$$

where:

A is the exchange constant and K is the anisotropy energy density and
$H_{K_u}$ is equal to $2K/M_s$.

This and the other relationships set forth are discussed in some detail in A. A. Thiele, Bell System Tech. Journ. pp. 3287–3335 December 1969. Domain size is of known consequence in the design of bubble devices. It is elemental to such fundamental considerations as packing density. Ordinarily domain size is desirably uniform throughout the film. In more complex devices in which it may be desirable to produce a gradient in domain size or other magnetic properties, such variations may result from temperature gradients during annealing.

(c) Coercivity.—This parameter is desirably reduced since it is indicative of the field required to propagate domain walls. It is seen from the following that the reduction in coercivity is usually at least proportional to the square root of $H_{K_u}$. Coercivity results from nonuniformity of system energy as a function of wall position. The nonuniformities can result from changes of $M_s$ or $\sigma_w$ (the $\sigma_w$ results from changes of A or K). Coercivity is reduced when K or, correspondingly $H_{K_u}$, is reduced. Coercivity is reduced through two processes when K (or $H_{K_u}$) is reduced. (1) with K reduced, the $\sigma_w$ is reduced and in some cases the change of system energy associated with the crystal nonuniformity may be reduced. (2) For nonuniformities of system energy which occur over distances which are small compared to domain wall thickness, the coercivity varies as the inverse of the wall thickness or as the square root of K.

(4) Compositional considerations

Compositions are discussed generally in terms of those found satisfactory from the standpoint of device parameters. Since the procedures of the invention are applied to heteroepitaxial garnet films, exemplary materials are those which have been found to be amenable to such growth. The following description is in terms of, first, film composition and, finally, substrate composition. Reference to LPE (liquid phase epitaxy) is an allusion to a procedure now considered favorable for the growth of films showing the requisite unique easy direction normal to the plane.

(a) The film.—Garnets suitable for the practice of the invention are of the general nominal stoichiometry of the prototypical compound $Y_3Fe_5O_{12}$. This is the classical yttrium iron garnet (YIG) which, in its unaltered form, is ferrimagnetic with net moment being due to the predominance of three iron ions per formula unit in the tetrahedral sites (the remaining two iron ions are in octahedral sites). In this prototypical compound, yttrium occupies the dodecahedral sites and the primary compositional requirement, in accordance with the invention, is concerned with the nature of the ions in part or in whole replacing yttrium in the dodecahedral sites.

A fundamental requirement for assurance of a LPE film manifesting essentially homogeneous uniaxial anisotropy substantially normal to the surface is that the dodecahedral site be occupied by at least two different ions. For the purpose of this invention, each of these ions referred to as A ions and B ions must be present in amount of at least 10 atom percent based on the total number of ions occupying dodacahedral sites. Ions which may occupy such sites in amount of at least 10 percent include $Y^{3+}$, $Lu^{3+}$, $La^{3+}$ and the trivalent ions of any of the $4f$ rare earths as well as ions of other valence states such as $Ca^{2+}$. Such ions are sometimes introduced for charge compensation, for example, where ions of valence state other than 3+ are substituted in part for iron. Compositions containing all such ions have been studied extensively and are reported, see, for example, Handbook of Microwave Ferrite Materials, Ed. by Wilhelm H. Von Aulock, Academic Press, New York (1965).

A further requirement pertains to the size and nature of the magnetostrictive contribution of the A and B ions <111> crystal directions. The simplest case concerns A and B ions that induce opposite magnetostrictive signs in this sense.

The following table is a computation of data presented in vol. 22, Journal of the Physical Society of Japan, p. 1201 (1967). This table presents the magnetostrictive values in dimensionless units representing centimeters change per centimeter of length for $R_3Fe_5O_{12}$ garnet compositions. The trivalent A or B ions are ranked in order of decreasing size.

TABLE I

| (A, B) ion | $\lambda_{<111>}$ | $\lambda_{<100<}$ |
|---|---|---|
| Sm | $-8.5\times10^{-6}$ | $+21\times10^{-6}$ |
| Eu | $+1.8\times10^{-6}$ | $+21\times10^{-6}$ |
| Gd | $-3.1\times10^{-6}$ | Zero |
| Tb | $+12.0\times10^{-6}$ | $-3.3\times10^{-6}$ |
| Dy | $-5.9\times10^{-6}$ | $-12.5\times10^{-6}$ |
| Ho | $-4.0\times10^{-6}$ | $-3.4\times10^{-6}$ |
| Y | $-2.4\times10^{-6}$ | $+1.4\times10^{-6}$ |
| Er | $-4.9\times10^{-6}$ | $+2.0\times10^{-6}$ |
| Tm | $-5.2\times10^{-6}$ | $+1.4\times10^{-6}$ |
| Yb | $-4.5\times10^{-6}$ | $+1.4\times10^{-6}$ |
| Lu | $-2.4\times10^{-6}$ | $-1.4\times10^{-6}$ |

A requirement of the invention is that the composition be of such nature as to yield its easy magnetic direction in the [111] direction normal to the film. This is in satisfaction of the requirement that anisotropy be primarily growth induced. Films prepared in accordance with the procedure herein, when annealed at sufficiently high temperature (about 1200° C. for times depending upon atmospheric condition), lose a substantial portion of their magnetic easy direction and become essentially magnetically isotropic. For the purposes of this invention, materials retaining less than 25 percent of their <111> anisotropy after annealing usually sufficient to make the material isotropic are satisfactory. (Such annealing, of course, removes stress-induced anisotropy but this type of anisotropy is regenerated on cooling.) This maximum tolerable <111> stress-induced anisotropy is not only a requisite of the invention but is desirable from a manufacturing standpoint in that it avoids modification in device properties resulting during fabrication and handling.

The larger grouping of compositions meeting the inventive requirements have been previously described as Type II materials. These materials are known to evidence their magnetic easy direction in the [111] crystallographic direction in the free (211) facet of a growing bulk crystal. Such Type II materials result, where the larger of the two ions has a negative magnetostrictive sign, while the smaller has a positive sign. This grouping is, however, not exclusive and instances occur in which the anisotropy of the growing bulk crystal is not determinative of the anisotropy of the LPE layer. A specific example of such a composition described in an example herein is $$Er_2Eu_1Fe_{4.3}Ga_{0.7}O_{12}$$

This and other such materials owe their uniaxial directive properties to the influence of the substrate. In the particular example, it is believed that the easy direction normal to the film is due to modification of the film composition by introduction of substrate ions by diffusion, for example, gadolinium, from a particular substrate used in some of the work reported herein.

EXAMPLES

Examples of film compositions meeting the inventive requirements are set forth:

$$Gd_{2.34}Tb_{.66}Fe_5O_{12}$$
$$Gd_{2.325}Tb_{.585}Eu_{.09}Fe_5O_{12}$$
$$Er_2Eu_1Ga_{.7}Fe_{4.3}O_{12}$$
$$Gd_{2.10}Tb_{.9}Fe_5O_{12}$$
$$Gd_{2.79}Tb_{.21}Fe_5O_{12}$$
$$Gd_{2.70}Nd_{.30}Fe_5O_{12}$$
$$Y_{1.00}Gd_{2.00}Al_{.33}Fe_{4.67}O_{12}$$

As noted above, Type II materials (i.e., those evidencing their easy magnetic direction in the [111] easy direction most nearly in the (211) free facet of a bulk grown crystal) result when particular pairs of ions occupy the dodecahedral site. Such Type II materials are suitable for the inventive purposes.

(b) The substrate.—Substrate requirements are apparent. Basically, device properties are to be attributed to the film itself and, ideally, device properties should in no way be affected by the substrate.

Epitaxial growth, of course, requires a reasonable match in lattice dimensions. From this standpoint, it has been found adequate to match lattices within about 0.5 percent ($a_0$, generally of the order of 12 angstroms). In general, it has been found adequate to match film to substrate at the device operating temperature. While there is some probable advantage to also matching the temperature coefficient of expansion so that the match would extend over the entire range of temperature encountered during fabrication, many of the devices reported herein show no such match in coefficient and operating characteristics are acceptable for device use.

Devices of concern depend on magnetic properties of the film, and the magnetic contribution of the substrate should be minimal. Ideally, for most devices, it would be preferred to have a substrate which is nonmagnetic. In order to get preferred matching, however, use has often been made of substrate materials which are strongly paramagnetic, again, with little noticeable effect on device operating characteristics. While a weakly ferrimagnetic material of ferromagnetic material could be used as a substrate, it is preferable that only the film be magnetically saturable at the operating temperature.

From the standpoint of film perfection, the substrate should be of the appropriate orientation; that is, (111), that it evidence a fair degree of crystalline perfection (in particular that it be essentially free of low angle grain boundaries), and that it be smooth and flat (preferably that it be optically flat). Since many device uses contemplated require optical readout, or sometimes even the use of light for recording information, the substrate should evidence the required transmission characteristics. Accordingly, since optical readout generally depends on rotation of plane polarized light, the substrate should be substantially nonbirefringent.

The substrate should generally have a resistivity of the order of $10^2$ ohm cm. or better to avoid eddy current losses.

The appropriate lattice parameter matching is most easily achieved by use of garnet substrates. While many substrate compositions are useful, it is possible to match substantially all film compositions of interest by use of but one or a combination of two basic substrate compositions. The first of these, $Nd_3Ga_5O_{12}$, has a lattice parameter $a_0$ equal to 12.52 A. The second, $Gd_3Ga_5O_{12}$, has a lattice parameter $a_0$ equal to 12.36 A. Either of these nominal compositions may be varied by slight departure from stoichiometry to produce concomitant change in $a_0$. Intermediate values may be obtained by mixtures of these two fundamental compositions as may be represented by the formula $Nd_xGd_{3-x}Ga_5O_{12}$. Intermediate values of $a_0$ are approximately linearly related to composition. All lattice parameter values set forth are those which have been reported at room temperature; it being the general requirement that film and substrate be matched at the operating temperature which is generally room temperature. It may be desirable to choose the two materials such as to result in substantial matching at operating temperature at other than room temperature.

The substrate composition examples set forth have been used in some of the material reported herein but are to be considered exemplary only. Other nonsaturable substrate materials may utilize other nonmagnetic ions in lieu of gallium. Examples are scandium and aluminum. Under most circumstances, occupancy of the dodecahedral site in the substrate composition is noncritical from an operational standpoint. Lattice matching may be achieved or optimized by partial or total substitution for Nd and/or Gd by any of the 4*f* rare earths or other ions known to form garnet structure.

(5) Examples

The following examamples are illustrative and, together with other experimental information indicated above, demonstrate the magnitude of effect obtainable on common materials.

Example 1.—A 4 micrometer thick film of $$Eu_1Er_2Fe_{4.3}Ga_{0.7}O_{12}$$

on a (111) $Gd_3Ga_5O_{12}$ substrate was placed in an oxygen atmosphere within a furnace maintained at a temperature of 1300° C. and was maintained at such temperature for a period of about 1¼ hours. The value of $H_{K_u}$ was reduced from an initial value of approximately 6500 oersteds to a final value of approximately 350 oersteds. Accompanying this approximately 20 fold decrease in the value of $H_{K_u}$ were an increase in mobility by the factor of 3 to a value of about 80 cm./second/oersted and a reduction in domain size by a factor of about 4 to a final optimum diameter of approximately 5 micrometers. Since the magnetization $4\pi M$ was about 200 gauss, this bubble size was approximately optimum for the film thickness indicated.

Example 2.—For comparison purposes, a similar film of the same composition and thickness on the same substrate was subjected to a temperature of approximately 1200° C. for a period of approximately 15 hours. Final values of $H_{K_u}$, mobility and domain diameter were approximately the same as those set forth in Example 1.

Example 3.—A similar film of the composition $$Eu_2Er_1Fe_{4.3}Ga_{0.7}O_{12}$$

and thickness 6 micrometers on a substrate of (110) oriented $Gd_3Ga_5O_{12}$ was exposed to a temperature of 1250° C. for a period of 1 hour to result in a reduction of $H_{K_u}$ to 400 oersteds. Attained properties of the final processed film were bubble diameter equal to 6 micrometers. Again, bubble size from a design standpoint is approximately optimum for the film thickness and magnetization ($4\pi M$ equals approximately 150 gauss).

Example 4.—A sample of $Gd_2Pr_1Fe_{4.7}Ga_{0.3}O_{12}$ was treated at a temperature of about 1250° for a period of about 1 hour, in an oxidizing atmosphere to result in a reduction in the magnitude of $H_{K_u}$ from an initial value of about 1500 oersteds to a terminal value of about 700 oersteds.

Example 5.—The procedure of Example 4 was repeated, however, using a garnet composition represented by the formula $Gd_{2.36}Tb_{0.66}Fe_5O_{12}$. Temperature and time of treatment were 1250° C. and 1 hour. The reduction in $H_{K_u}$ was approximately 500 oersteds.

Example 6.—The procedure of Example 4 was repeated, using a garnet composition represented by the formula $Y_{1.9}Eu_{0.2}Gd_{0.5}Tb_{0.4}Al_{0.6}Fe_{4.4}O_{12}$. Temperature and time were 1200 C. and 4 hours. The anisotropy energy density was reduced from 9900 ergs./cm.$^3$ to 4300 ergs./cm.$^3$ by this treatment.

Example 7.—The procedure of Example 4 was repeated, using a garnet composition represented by the formula $Y_2GdAl_{0.8}Fe_{4.2}O_{12}$. Temperature and time were 1150° C. and 16 hours. The anisotropy energy density was reduced from 3380 ergs./cm.$^3$ to 1450 ergs./cm.$^3$ by this treatment.

What is claimed is:

1. Method for the fabrication of a device comprising growing a heteroepitaxial layer of a magnetic garnet composition, the crystallographic dodecahedral site of which is occupied by at least two different ions each of which is present in amount of at least 10 atom percent based on the total number of ions occupying dodecahedral sites on a substrate also of garnet composition but evidencing a lowered value of magnetization relative to the said layer, said layer having a unique easy direction of magnetization approximately normal to its surface, said layer evidencing growth-induced easy direction of magnetization, characterized in annealing said layer in an oxidizing atmosphere within the range of from about 1200° C. to about 1350° C. for a period adequate to reduce the value of $H_{K_u}$ for the said layer by an amount of at least 10 percent from its initial value, where $H_{K_u}$ is defined as the applied field required to rotate the magnetization from the said direction normal to the said layer surface to a direction coinciding with the meduim axis perpendicular to the said easy direction.

2. Method of claim 1 where the time of anneal is at least one hour at 1200° C. with such time being reduced by a factor of five for each increase in temperature of about 50° C.

3. Method of claim 2 in which said time of anneal at 1200° C. is at least 4 hours.

4. Method of claim 1 in which said device is dependent for its operation on the propagation of enclosed domains and in which the said anneal is of sufficient length to produce an optimum domain diameter approximately equal to the thickness of the said layer.

5. Method of claim 4 in which the said layer thickness is from about 2 micrometers to about 200 micrometers.

6. Method of claim 1 in which the annealing atmosphere contains an amount of oxygen sufficient to produce a partial pressure equal to that of oxygen in the layer under the processing conditions.

7. Method of claim 6 in which the annealing atmosphere consists essentially of oxygen.

8. Method of claim 1 in which the temperature within the layer during annealing evidences a spacial gradient in the direction parallel to its major surface.

9. Method of claim 1 in which the temperature range is from about 1275° C. to about 1325° C.

References Cited

UNITED STATES PATENTS

| | | | |
|---|---|---|---|
| 3,003,966 | 10/1961 | Van Uitert | 252—62.57 |
| 3,444,084 | 5/1969 | Geller et al. | 252—62.57 |
| 3,607,390 | 9/1971 | Comstock et al. | 117—237 |

OTHER REFERENCES

Sawatzky et al.: J.O.A.P., vol. 42, No. 1, January 1971, pp. 367–375.

Josephs; IEEE Trans on Mag., vol. 6, No. 3, September 1970, pp. 553–558.

Heinz et al.: J.O.A.P., vol. 42, March 1971, pp. 1243–1251.

RALPH HUSACK, Primary Examiner

B. D. PIANALTO, Assistant Examiner

U.S. Cl. X.R.

117—235